W. ENSMINGER.
AUTOMOBILE LIGHT.
APPLICATION FILED FEB. 5, 1916.
1,198,710.
Patented Sept. 19, 1916.
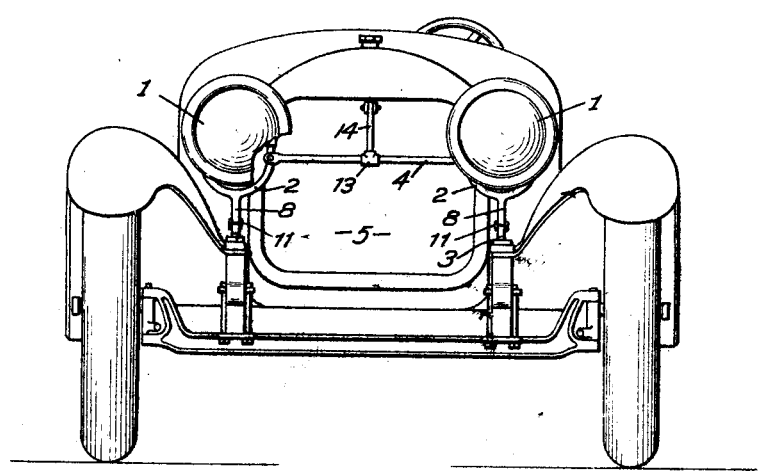
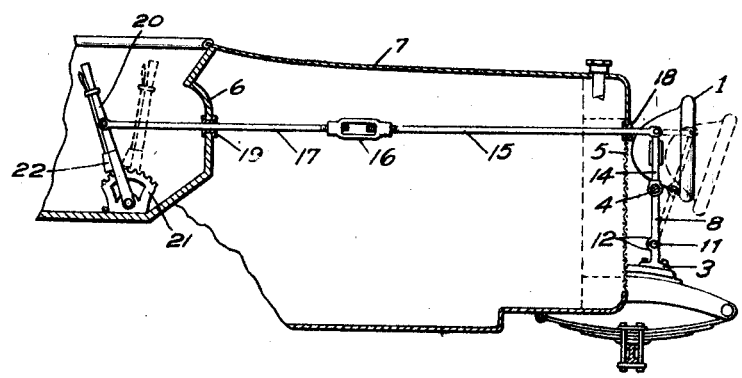
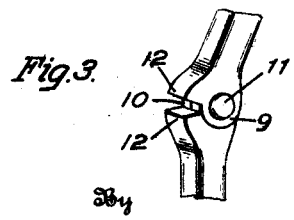

UNITED STATES PATENT OFFICE.

WILLIAM ENSMINGER, OF CLEVES, OHIO.

AUTOMOBILE-LIGHT.

1,198,710.

Specification of Letters Patent. Patented Sept. 19, 1916.

Application filed February 5, 1916. Serial No. 76,283.

*To all whom it may concern:*

Be it known that I, WILLIAM ENSMINGER, a citizen of the United States, and a resident of Cleves, in the county of Hamilton and State of Ohio, have invented certain new and useful Improvements in Automobile-Lights, of which the following is a full, clear, and exact description, reference being had to the accompanying drawings, forming part of this specification.

My invention relates to automobile lights and lights for kindred purposes, wherein the lamps are capable of being tipped downwardly.

There have been patented several devices for tipping the lights of an automobile downwardly from a horizontal position for the purpose of avoiding the blinding of approaching persons, but these devices are expensive and complicated. In the high powered lights of today, it is the general custom, however, to provide a cover to shield a portion of the beam of light from a headlight for the above purpose, and a requirement for the provision of some such device is on the statute books of many public corporations. There are also certain expensive "dimmers" applied to electric lights in such vehicles whereby the bright light may be turned off and a dim light employed in crowded districts or to avoid blinding passers-by on the road.

The shield device for lights is not a satisfactory method of providing against the brilliancy of headlights in motor vehicles, because it is not capable of being removed when operating on an open road. The devices that have come to my attention for tipping downwardly the vehicle lights have been of complicated nature and impractical from a commercial point of view.

It is accordingly my object to provide a simple and inexpensive means for hinging the light supporting brackets and for moving the lamps together from a proper dash control.

It is my object to provide the fewest number of new parts necessary and to in no wise alter the outer appearance of the car to which my device is attached.

These objects I accomplish by that certain construction and arrangement of parts to be hereinafter more specifically pointed out and claimed.

In the drawings, Figure 1 is a front elevation of a motor vehicle with my new device attached. Fig. 2 is a section taken through the hood of the vehicle showing the operating parts in side elevation. Fig. 3 is a detail perspective view of the preferred type of hinge employed for the light supporting brackets.

The lamps 1, as shown, are mounted on the usual forks 2 of the lamp bracket. This bracket is suitably mounted on the frame of the vehicle by means of a plate 3 or any other means. The two fork members are connected by the usual cross bracing rod 4 which holds the lamps firmly together and prevents rattle and vibration. The vehicle has the usual radiator 5 and dash 6, and over the engine is the usual hood 7, lying between the radiator and the dash. These parts are not to be of any particular type as I design to employ my invention with any standard method of mounting the usual lamp brackets, and my invention is applicable to all vehicles having the lamps supported as above described.

I provide a butt-hinge in the shank 8 of the lamp bracket, said hinge comprising bosses 9 and 10 on the upper and lower portions of the shank, a pivot pin 11 and shoulders 12, 12. I cut the cross rod 4 and insert therein a T 13, said T carrying a vertical rod 14.

Pivoted to the rod 14 is a rod 15, which is connected by a turn buckle 16 with a rod 17 that passes through the dash of the car. This turn buckle allows the taking up of any slack in the line from the vertical rod to the dash and also allows the easy moving out of the way of the rods when repairing parts of the engine. In such case the buckle is disconnected and the outer rod 15 drawn out through the radiator.

The passage of the rod 15 through the radiator is accomplished by means of a bushing 18 that is set into the radiator front, the rod itself passing beneath the water chamber of the radiator and between the tubes thereof (not shown). A bushing 19 is set into the dash for the passage of the rod 17, and this rod is operated by a lever 20 which works over a segment rack 21 with some form of spring dog 22.

The method shown of operating the rod 17 is not the only method which I design to employ, but is only shown as a simple device to accomplish the desired purpose. It will be noted that the number of parts, exclusive of the operating lever, is very few and that the device could be set up by any mechanic without any difficulty.

The butt-hinge is so arranged that it will be closed when the lamps are in a position to throw a horizontal ray of light, and when the rod 17 is pushed forwardly from the driver's seat, the vertical rod 14 will be tipped in a like direction and the lamps will be moved to a position to throw the ray of light downwardly and toward the ground so that it will not shine in the eyes of a passer-by.

The light will then be directed to a spot close to the car, which is desirable in passing other vehicles or pedestrians or driving in city traffic, and it is not diminished in brilliancy, thereby depriving the driver of proper vision of the road near his car. Moreover, the dipping of the light and throwing the rays from the reflector to the ground a short distance from the car is of great advantage in turning corners, as the road at the curve is brilliantly illuminated and as the car turns, the light is projected around the curve, thus obviating the necessity of any device such as has been proposed whereby the lamps are revolved on a vertical pivot as the car turns the corner.

It is the usual custom to mount the license tag on the cross rod 4 between the lamp brackets and this tag will ordinarily conceal all of the exposed parts of my device, as the tag will be high enough to conceal the vertical rod from view. The fact that the hinge is a butt-hinge removes any difficulty in returning the lamps to their original position after operation thereof, as the operator merely pulls upwardly the operating lever until the lamps are stopped in movement by the closing of the hinge.

Having thus described my invention, what I claim as new and desire to secure by Letters Patent, is:—

1. In a device of the character described, a pair of lamp brackets having shanks and forks, lamps on the forks, hinges set into the shanks so that the upper portion thereof will bend forward from the vertical, a cross bar extending across between the forks and connected to a tine of each of said forks, a reciprocating bar for operating the device, said bar having operative connection to the said cross bar, and adapted to swing the bar forward, and cause a tipping of the forks, lamps and bar as a unit.

2. In a device of the character described, a pair of lamp brackets having shanks and forks, lamps on the forks, hinges set into the shanks so that the upper portion thereof will bend forward from the vertical, a cross bar extending across between the forks and connected to a tine of each of said forks, a reciprocating bar for operating the device, said bar having operative connection to the said cross bar, and adapted to swing the bar forward, and cause a tipping of the bar forward, and cause a tipping of the forks, lamp and bar as a unit, said hinges in the shanks being butt hinges and adapted when closed to hold the shanks in vertical alinement.

WILLIAM ENSMINGER.